May 3, 1955     H. W. DRIEHAUS     2,707,627

CUTTER BAR

Filed Oct. 8, 1953

INVENTOR.
HERMAN W. DRIEHAUS
BY
Murray A. Gleeson
ATTORNEY

United States Patent Office 2,707,627
Patented May 3, 1955

2,707,627
CUTTER BAR

Herman W. Driehaus, Chicago, Ill., assignor to Goodman Manufacturing Company, Chicago, Ill., a corporation of Illinois Application October 8, 1953, Serial No. 384,941

2 Claims. (Cl. 262—33)

This invention relates to improvements in cutter bars adapted for use with kerf-cutting machines and, more particularly, to cutter bars of the so-called "box" type, wherein the main body of the bar is made up of two parallel spaced upper and lower plates connected near their margins by upright metal strips.

It is common practice to form such "box" type cutter bars by welding the edges of the upright strips to the inner faces of the upper and lower plates at a short distance from the margins of said plates, so as to form, with the addition of suitable wearing strips, U-shaped cutter chain guides along opposite sides of the cutter bar. It has been found by experience, however, that the welding of the upright strips in this manner introduces serious problems of warpage of the plates, whereby the thermal stresses introduced in the plates, during heating and cooling of the metal, sometimes warps the projecting edges of each plate inwardly toward the other plate as much as one-quarter of an inch. Attempts have been made to compensate for such warpage by pre-bending the margins of the plates, but this is a costly operation and is unsatisfactory in practice, because the amount of warpage varies in localized areas, which causes waviness and twists in the cutter bar which must be taken out by additional press-straightening or machining operations.

The object of the present invention is to overcome the difficulties above mentioned by providing an improved construction and method of manufacture, by welding the two plates together so as to eliminate the objectionable effects of warpage.

The invention may best be understood by reference to the accompanying drawings, in which.

Figure 1:
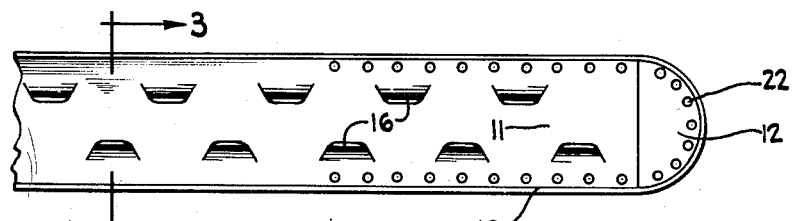
Figure 1 is a plan view of a cutter bar section constructed in accordance with my invention.

Referring now to details of the embodiment of the invention shown in the drawings, an elongated cutter bar, indicated generally at 10, is of the general type commonly used on mining machines for cutting kerfs in the working face of coal mines, and includes a main body 11 and a semi-circular end piece 12. The cutter bar serves the usual purpose of supporting an endless cutter chain, and is adapted to be connected to the frame of a kerf-cutting machine, but the cutter chain and mining machine are not shown as they form no part of the present invention.

Figure 3:
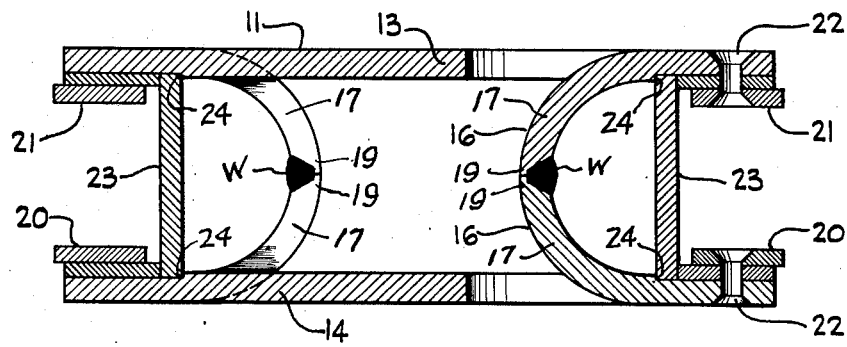
Figure 3 is an enlarged detail section taken on line 3—3 of Figure 1.
Figure 4:
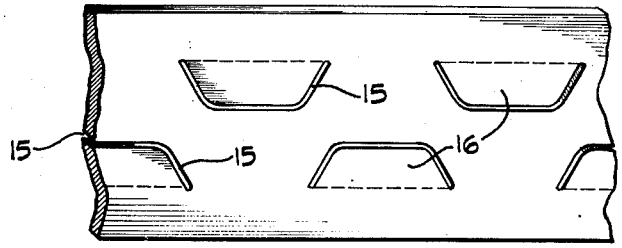
Figure 4 is a fragmentary detail view of one of the plates forming the bar, showing the tines cut in said plate before they are bent into shape for connection to mating tines of a similar plate.

The cutter bar body 11 consists primarily of two parallel spaced metal plates 13 and 14 to form the upper and lower elements of a box-like structure, as shown in section in Figure 3. Each of said plates is initially formed with a series of elongated slots 15, 15 cut therethrough as by an acetylene torch, said slots having their ends terminating in alignment with each other in equispaced relation with opposite margins of each plate, and with the connecting portions of said slots bowed inwardly from said margins to form a series of similar tongues or tines 16, 16, as shown in Figure 4. All of the tongues of each plate are then bent in one direction out of the plane of their respective plates, with their intermediate portions 17 preferably curved on a relatively wide arc, and their free ends 19 disposed substantially at right angles to the plate from which they project, as shown in Figure 3.

As an alternate way of constructing the cutter bar shown, the tongues or tines 16, 16 may be simultaneously cut and formed by a punching operation, so long as the thickness of the plates 13, 14 does not exceed about three-fourths of an inch, in which case the elongated slots 15, 15 would have substantially no width.

As will further be observed from Figure 1, the tongues 16 along one side of each plate are preferably disposed in staggered relation to the tongues along the opposite side of the same plate, in order to maintain the longitudinal strength of the plates.

Figure 2:
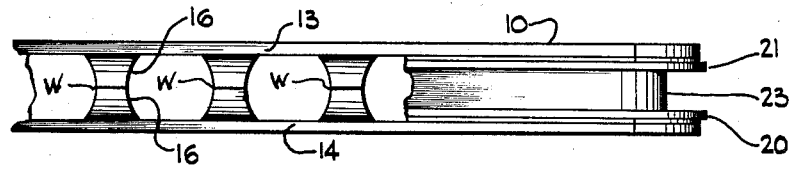
Figure 2 is a side view of the cutter bar section shown in Figure 1, with a portion of the wearing strips removed to show the inturned tines welded along one side of the bar.

As indicated in Figure 2, the upper and lower plates 13 and 14 are provided with oppositely matching sets of these tongues 16 along each side of the bar. The two plates are permanently secured together by welding the inner or free ends of the matching tongues. It will be observed from Figures 2 and 3 that the several lines of weld W, W are disposed along a median plane between the upper and lower plates 13 and 14, which plane may, for convenience, be termed a "neutral axis," whereby any distortion due to heating and cooling of the welds will be absorbed by bending of the individual tongues, thus minimizing any warping of the plates themselves.

After the plates 13 and 14 are welded together by the tongues 16, the cutter chain guides along opposite sides of the bar are completed by applying upper and lower wearing strips 20 and 21 along the projecting margins of said plates, which may be secured in the conventional manner by rivets 22. An inner wear strip 23 is also fixed in upright position between the plates and outside the rows of tongues, as seen in Figure 3. In the form shown herein, the upper and lower wearing strips 20 and 21 hold the inner wearing strip 23 against narrow shoulders 24, 24 formed along the bases of the tongues 16, so that no other means is required for securing said inner wearing strip in place.

Although I have shown and described a certain embodiment of my invention, it will be understood that I do not wish to be limited to the exact construction shown and described, but that various changes and modifications may be made without departing from the spirit and scope of the invention as defined in the appended claims.

I claim:

1. In a chain-carrying cutter bar for a kerf-cutting machine, two parallel spaced elongated sheet-metal plates each having a series of tongues partially severed from the body thereof and bent inwardly and downwardly along parallel lines spaced from the margins of each plate toward the other plate, and with the free ends of said tongues welded together substantially along the median plane between said plates to form a unitary box-like structure with U-shaped chain guide slots along opposite edges of said bar, and cutter chain wearing strips disposed in upright position along and between the sheet-metal plates with their upper and lower edges in engagement with the bases of the inwardly bent tongues.

2. A cutter bar structure in accordance with claim 1, wherein the bases of the tongues have outwardly facing upright shoulders formed therealong for engagement by the edges of the wearing strips.

References Cited in the file of this patent

UNITED STATES PATENTS

| | | |
|---|---|---|
| 1,249,785 | Layman et al. | Dec. 11, 1917 |
| 1,272,762 | Baughman | July 16, 1918 |
| 1,801,080 | Hart et al. | Apr. 14, 1931 |

FOREIGN PATENTS

| | | |
|---|---|---|
| 850,628 | France | Sept. 18, 1939 |